United States Patent

Kohn et al.

[11] Patent Number: 5,819,991
[45] Date of Patent: Oct. 13, 1998

[54] BOTTLE-TYPE PLASTIC CONTAINER

[75] Inventors: Udo Kohn, Darmstadt; Franz Steigerwald, Griesheim, both of Germany

[73] Assignee: Wella AG, Darmstadt, Germany

[21] Appl. No.: 693,149

[22] PCT Filed: Dec. 18, 1995

[86] PCT No.: PCT/EP95/05009

§ 371 Date: Aug. 9, 1996

§ 102(e) Date: Aug. 9, 1996

[87] PCT Pub. No.: WO96/19384

PCT Pub. Date: Jun. 27, 1996

[30] Foreign Application Priority Data

Dec. 21, 1994 [DE] Germany .......... 44 45 398.1
Mar. 30, 1995 [DE] Germany .......... 195 11 611.9

[51] Int. Cl.$^6$ .......... B65D 37/00
[52] U.S. Cl. .......... 222/215; 220/453; 428/36.5
[58] Field of Search .......... 222/215; 215/12.1; 220/453; 428/36.5, 319.3, 319.7, 319.9

[56] References Cited

U.S. PATENT DOCUMENTS

| | | | |
|---|---|---|---|
| 2,758,755 | 8/1956 | Schafler | 222/215 |
| 3,221,954 | 12/1965 | Lux | 222/566 |
| 4,847,148 | 7/1989 | Schirmer | 428/319.3 X |
| 5,108,833 | 4/1992 | Noguchi et al. | 428/319.3 X |
| 5,409,774 | 4/1995 | Pehlert et al. | 428/319.3 X |

FOREIGN PATENT DOCUMENTS 1116910  6/1968  United Kingdom .......... 222/215

*Primary Examiner*—Joseph Kaufman
*Attorney, Agent, or Firm*—Michael J. Striker

[57] ABSTRACT

The bottle-type container (1,1.1) produced with a reduced material input is made of an expanded plastics material (3), has a dimensionally-resilient shell wall (2,2.1) and is provided with a metering opening (7) for metered dispensing of a liquid product contained in the container by applying a manual pressure to the container with one hand. The expanded plastics material (3) is from 10% to 30% less dense than the same plastics material in a non-expanded state, the container has a maximum container volume of 1500 ml, the shell wall (2,2.1) has thickness of from 0.5 to at maximum 1.5 mm, and the thickness of the shell wall (2,2.1) has an approximately proportional relationship to the container volume.

12 Claims, 1 Drawing Sheet

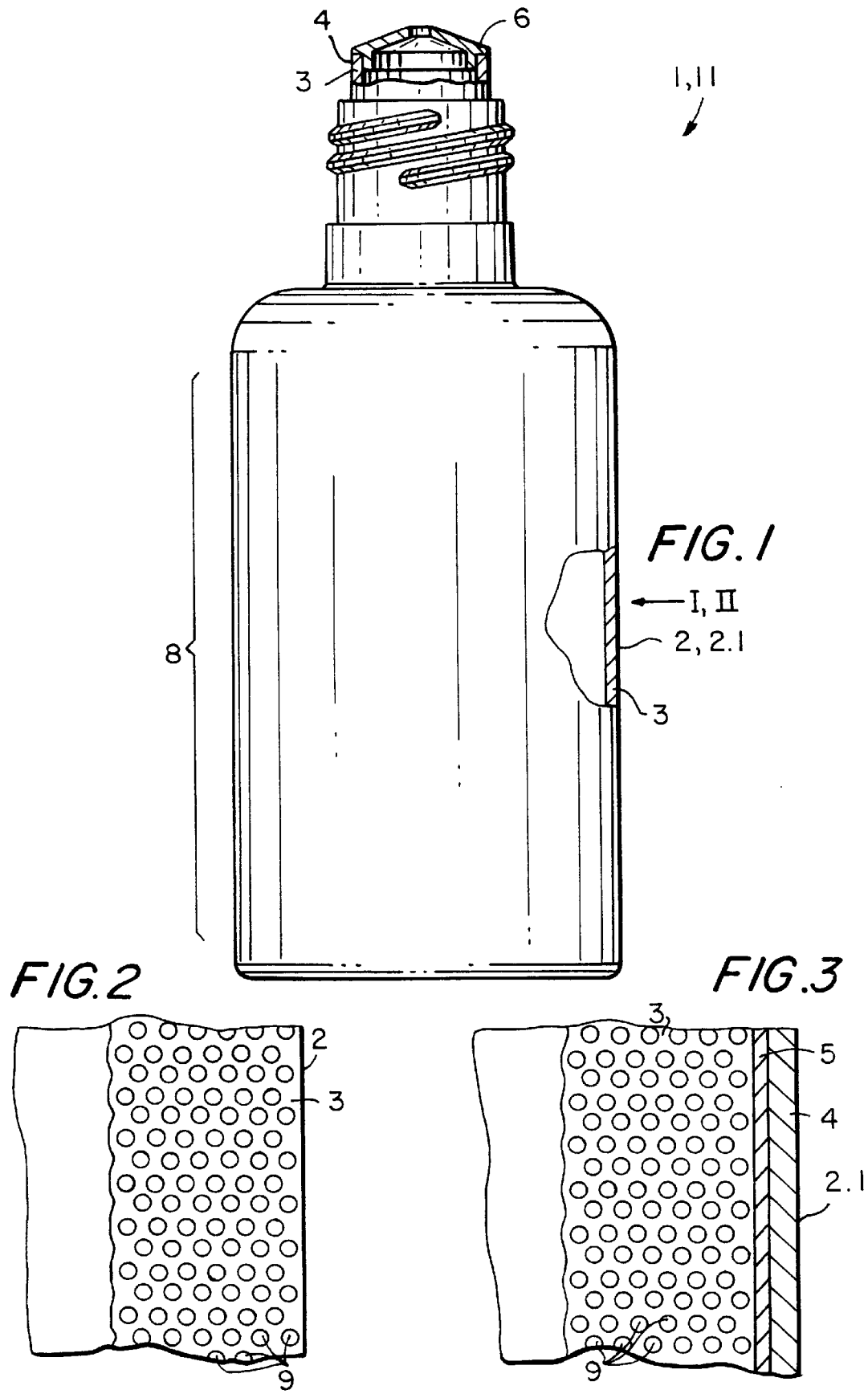

BOTTLE-TYPE PLASTIC CONTAINER

BACKGROUND OF THE INVENTION

The invention concerns a bottle-type plastic container made of an expanded plastic material and comprising a dimensionally-resilient shell wall and a metering opening so that manual pressure on the dimensionally-resilient shell wall with one hand results in the dispensing of a liquid product contained in the plastic container.

Such containers are commonly used for liquids which are dispensed in measured quantities by squeezing the container. The containers are made of compact plastic, preferably of polyolefins having a density of approx. 0.9 to 0.97 g/cm$^3$ As part of the effort to reduce the amount of material used in packaging, an attempt was made to make the wall of the container thinner. Reduction of the amount of material used in packaging is a current goal of ecological policy. A lower input of material contributes to a more favorable ecological balance sheet for the packaging and the product. Packaging must be recycled. The cost of recycling is calculated on the basis of the weight of the input material used for the packaging. The cost of recycling plastic packaging is particularly high. In Germany, for example, these costs are higher than the actual price of the material. However, efforts to reduce the material input in the case of state of the art containers of this kind have hitherto been subject to limits. For example, optimization enabled the weight of a 250 ml bottle to be reduced to a lower limit (material input weight) of 20 g polypropylene. The thickness of the shell wall of this bottle was approximately 0.7 mm. An attempt was made to reduce the material input weight even further to 15 g polypropylene. This resulted in a shell wall thickness of approx. 0.5 mm. In carrying out this and other comparable experiments aimed at reducing the wall thickness it was ascertained that squeezing the bottle to dispense the product resulted in a kinking of the unstable shell wall which adversely affected the elastic resilience and pumping capability of the bottle and rendered it unsightly after a short period of use, which was also highly deleterious to the appeal of the product.

Extrusion blow molded foamed plastic containers (bottles) are also known from U.S. Pat. No. 3,221,954. These, however, have large outlet apertures and a relatively thick shell wall with deformation and elasticity properties that make them unsuitable for measured dispensing by squeezing.

SUMMARY OF THE INVENTION

It is accordingly the aim of the invention to create a container of the above-described kind which, despite a further reduction of material input, does not kink and exhibits a high or equal stability when the shell wall is squeezed for measured dispensing of the contents.

According to the invention, the bottle-type container is made of an expanded plastics material, comprises a dimensionally-resilient shell wall and is provided with a metering opening for metered dispensing of a liquid product contained in the container by applying a manual pressure to the container with one hand, wherein the expanded plastics material is from 10% to 30% less dense than the same plastics material in a non-expanded state, the container has a maximum container volume of 1500 ml and the shell wall has thickness of from 0.5 to 1.5 mm, the thickness being approximately proportional the container volume.

In preferred embodiments of the invention the expanded plastics material is a polyolefin, such as polypropylene or polyethylene (e.g. HDPE) or their copolymerides. The container can be a number of different sizes, for example advantageously it can have a volume of 250 ml and the shell wall approximately 0.7 mm thick, or it can have a volume of 600 ml with a shell wall thickness of about 0.9 mm.

The shell wall can be smooth surfaced. It can be provided with an outer skin composed of the same plastics material as the expanded plastics material or of a different plastics material. A barrier layer, advantageously polyamide or ethylene vinyl alcohol, which provides a barrier to diffusion of gas or fluid can be provided between this outer skin and the expanded shell wall.

The invention makes available bottle-type containers for liquid products which require up to 30% less material input than conventional compact plastic bottles while exhibiting an equal qualitative appeal and utility. This up to 30% reduced material input—the container having the same wall thickness as conventional containers made with reduced material input—is attributable to the very finely distributed foam bubbles embedded in the plastic. A higher proportion of foam bubbles would weaken the material and result in kinking or fracture. The surface of the container wall can also be of smooth texture, i.e. without the so-called orange peel effect, this being attainable, for example, in an extrusion blow molding process with the following optimized parameters: temperature of the tube used, as material for molding, the nature, grain size and proportion used of the chemical blowing agent and the blowing pressure. In addition to this, a label adheres better to a relatively smooth surface. The reduced material input bottle-type container—preferably produced by the extrusion blow molding process—has a sealable aperture and the container wall is deformed by squeezing with the hand to dispense the contents through the aperture. The container wall consists entirely or for the most part of foamed plastic, preferably foamed polyolefins (especially suitable for liquids), such as polypropylene (PP), polyethylene (PE) or their copolymers, the density of the foamed material being up to 30% lower than the density of the same unfoamed material. The wall thickness of the container is—as is usual in the case of plastic bottles of this kind—less than 1.5 mm at the shell wall, and preferably 0.5 to 1 mm. The container is produced in a single stage extrusion blow molding process directly from the melt. The foam is produced by the addition of a chemical blowing agent such as polycarbonic acid and carbonate compounds which, when used together with extruder screws of high mixing and homogenizing capability, form finely distributed gas bubbles in the melt. For reasons of handling and stability the maximum volume of the containers produced is to be 1,500 ml.

The outer skin of the container may also be made of the compact material accounting for at maximum 20% of the total wall thickness and this outer skin may be made of a material other than the foamed material. It is also possible to interpose a thin layer of a seal material, such as polyamide (PA) or ethylene vinyl alcohol (EVOH), between the outer skin and the foamed wall in order to create a barrier for certain gases or liquids.

The invention makes it possible to produce serviceable containers of the same kind as the conventional ones with up to 30% less material input. For example, it is possible to produce a 250 ml bottle made of PP with an input weight of 15 g. The wall of this bottle has a thickness of approximately 0.7 mm, the density of the material, preferably polypropylene foam, being approximately 0.72 g/cm$^3$. Another example deals with a 600 ml bottle made of PP with a wall thickness of 0.9 mm. The rough surface texture ("orange peel") of the bottle occasioned by the foam (depending on the production process) can be covered with a compact, smooth outer skin of the same or another material (for example, by co-extrusion) in order to restore the aesthetic appeal of a smooth surface.

BRIEF DESCRIPTION OF THE DRAWING

The objects, features and advantages of the invention will now be illustrated in more detail with the aid of the following description of the preferred embodiments, with reference to the accompanying figures in which:

FIG. 1 is a partially side view, partially cross-sectional view of a bottle-type plastic container according to the invention;

FIG. 2 is a detailed cutaway cross-sectional view of the shell wall of a bottle-type plastic container according to a first embodiment; and FIG. 3 is a detailed cutaway cross-sectional view of the shell wall of a bottle-type plastic container according to a second embodiment.

DESCRIPTION OF THE PREFERRED EMBODIMENT

FIG. 1 shows two embodiments of a bottle-type plastic container 1,1.1 with a squeezable shell wall 2 which is mainly composed of foamed or expanded plastic. The foamed plastic 3 is preferably a polyolefin, such as polypropylene or polyethylene or their copolymers. The density of plastic 3 is at least 10% and at maximum 30% lower than the density of the same plastic in its unfoamed state. The shell wall thickness 2 depends on the volume, but the maximum shell wall thickness is 1.5 mm (for example, 0.7 mm for 250 ml and 0.9 mm for 600 ml). A dosing or squirting insert 6 with a relatively small aperture or opening 7 is fitted for measured dispensing of a liquid product. A separate insert 6 may be omitted if the aperture at the neck of the bottle is made smaller.

FIG. 2 shows a section of the shell wall 2 which, in this first embodiment, consists entirely of foamed plastic 3. FIG. 2 also shows individual foam bubbles 9 in the foamed plastic 3.

FIG. 3 shows a second embodiment in which the shell wall 2.1 is covered with an outer skin 4 which may optionally be made of another plastic than the foamed plastic 3. A seal layer 5 may optionally be interposed between the outer skin 4 and the foamed shell wall 2.1—especially as a barrier against gas or liquid diffusion. The seal layer 5 may be made of PA or EVOH.

For good squeezability the container 1, 1.1 should have an essentially circular, rectangular or oval cross section at least in squeezing area 8.

In the extrusion and blowing process the effect of an uncontrolled expansion of the tube and the accompanying required process measures this would necessitate are precluded by the fact that the density of the foamed material of the bottle wall is at least 10% and at maximum 30% lower than the same material in its compact form. Only the density range and other features described assure that all the above mentioned requisite functions are fulfilled (in particular, the avoidance of kinking). Significant deviations result in a deterioration of properties relevant to serviceability such as a reduction of squeezability and undesirable kinking or a loss of subjective product quality appeal and to unfavorable conditions for the manufacture of the container.

We claim:

1. A bottle-type container (1,1.1) made of an expanded plastics material (3), comprising a dimensionally-resilient shell wall (2,2.1) and provided with a metering opening (7) for metered dispensing of a liquid product contained in the container by one-handed application of a manual pressure to the container, wherein the expanded plastics material (3) is from 10% to 30% less dense than the same plastics material in a non-expanded state, the container has a maximum container volume of 1500 ml and the shell wall (2,2.1) has a thickness of from 0.5 to at maximum 1.5 mm, the thickness of the shell wall (2, 2.1) having an approximately proportional relationship to the container volume, so that comparatively less of said expanded plastics material is required to make the container while maintaining container strength.

2. The container as defined in claim 1, wherein the expanded plastics material is a polyolefin.

3. The container as defined in claim 2, wherein said polyolefin is polypropylene, polyethylene, a copolymer of polypropylene or a copolymer of polyethylene.

4. The container as defined in claim 2, wherein said polyolefin is high density polypropylene (HDPE).

5. The container as defined in claim 1, wherein the container has a container volume of 250 ml and the shell wall thickness is approximately 0.7 mm thick.

6. The container as defined in claim 1, wherein the container has a container volume of 600 ml and the shell wall thickness is approximately 0.9 mm thick.

7. The container as defined in claim 1, wherein the shell wall has a smooth surface.

8. The container as defined in claim 1, further comprising an outer skin (4) composed of the same plastics material as the expanded plastics material.

9. The container as defined in claim 8, further comprising a barrier layer (5) between the outer skin (4) and the shell wall (2.1).

10. The container as defined in claim 9, wherein the barrier layer is composed of polyamide (PA) or ethylene vinyl alcohol (EVOH).

11. The container as defined in claim 1, further comprising an outer skin (4) made of a different plastics material than the expanded plastics material.

12. The container as defined in claim 1, further comprising a substantially circular, rectangular or oval-shaped container base or container cross-sectional member provided at least in a deformable region (8) thereof.

* * * * *